UNITED STATES PATENT OFFICE.

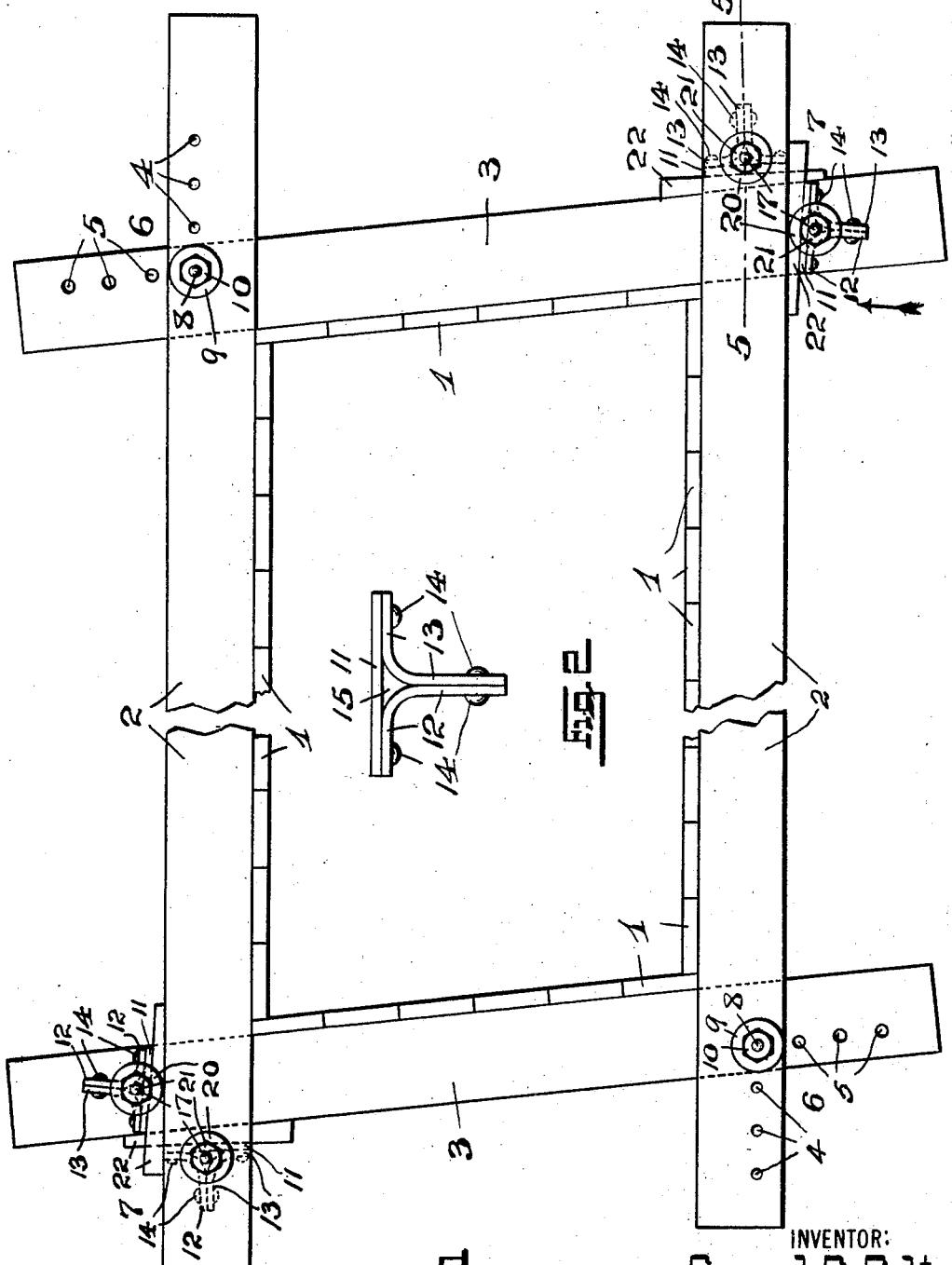

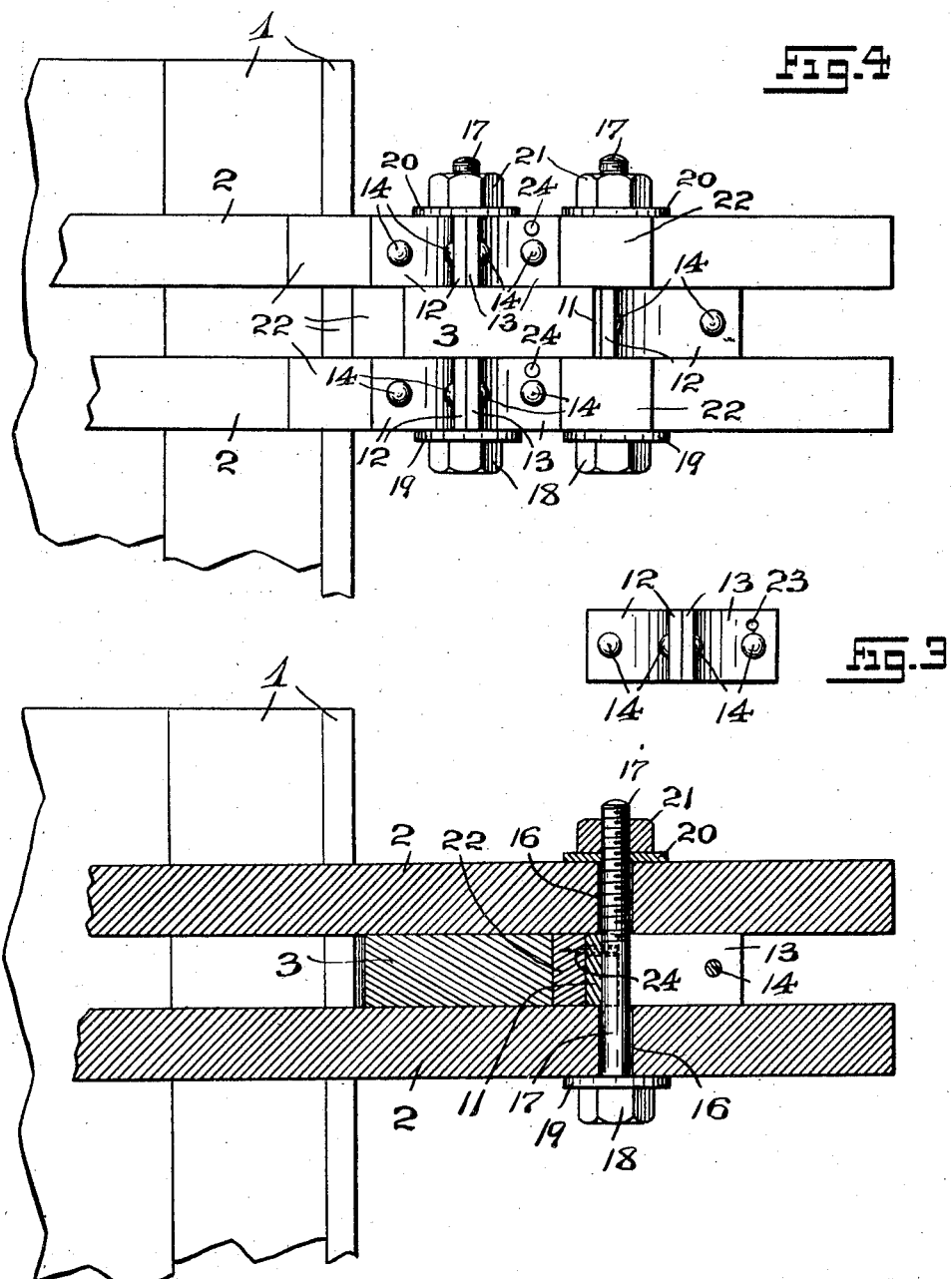

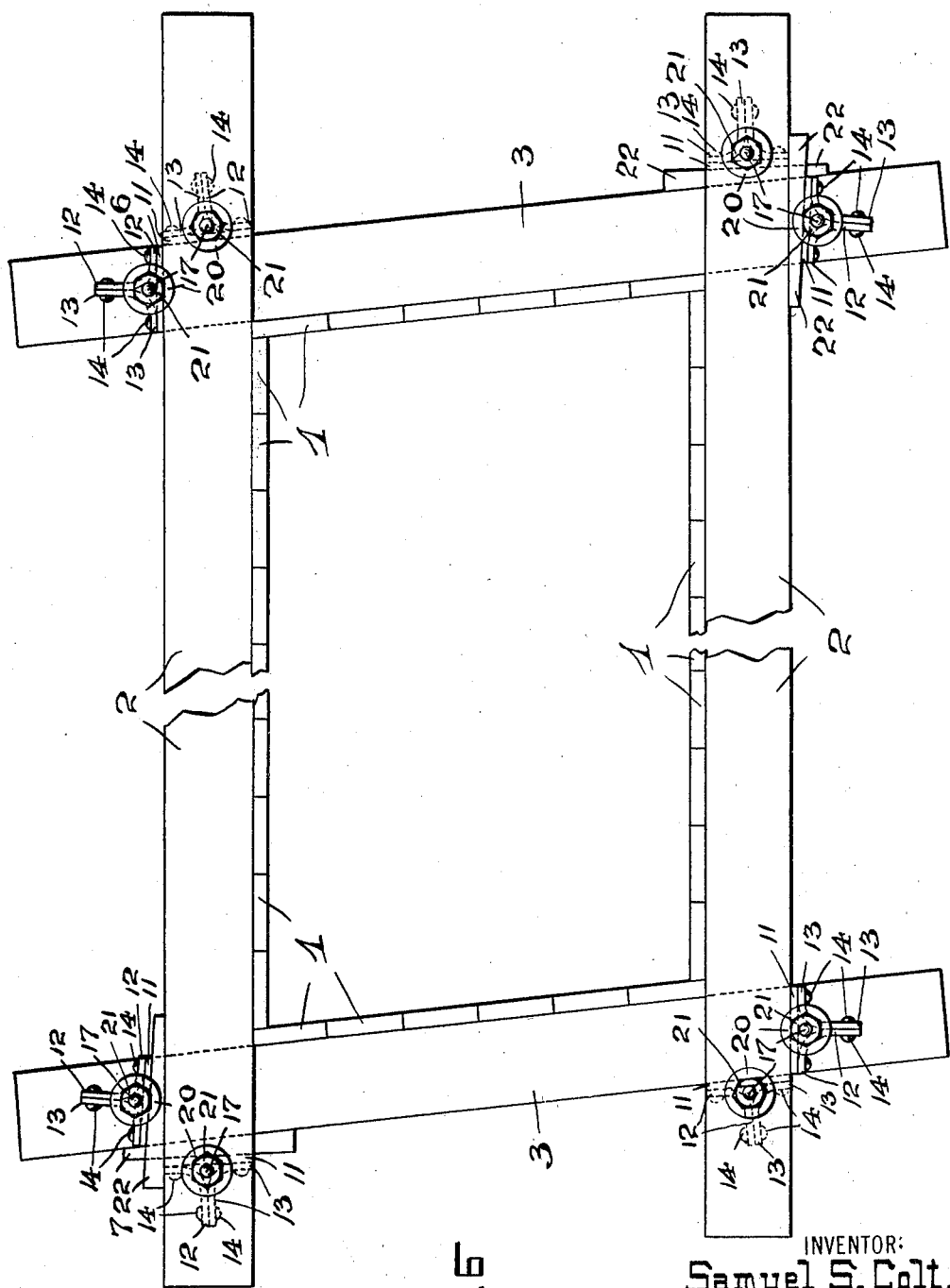

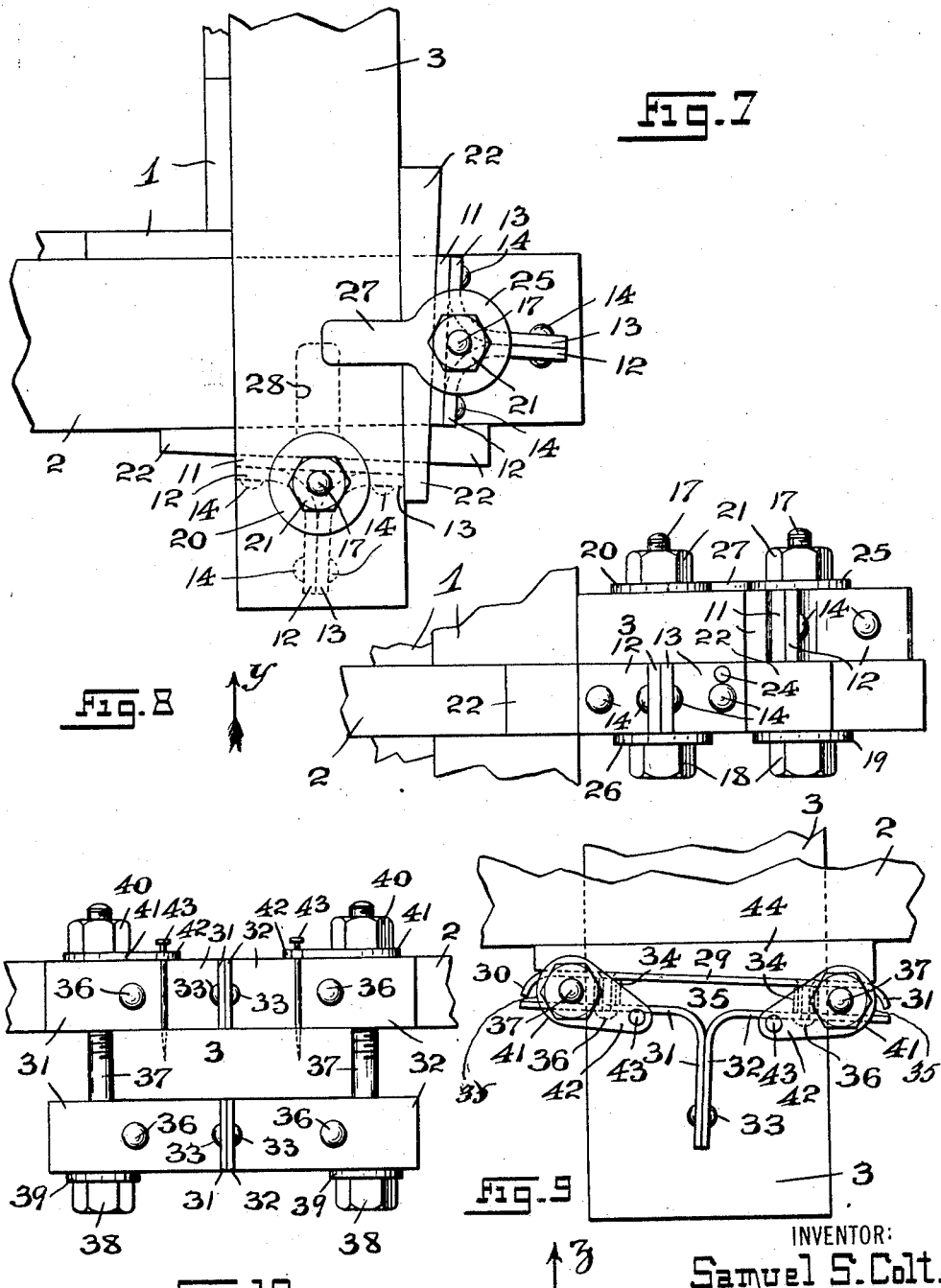

SAMUEL S. COLT, OF ORANGE, NEW JERSEY.

MOLDING APPARATUS AND CLAMPING MEANS THEREFOR.

1,358,417.       Specification of Letters Patent.        Patented Nov. 9, 1920.

Application filed January 5, 1920. Serial No. 349,450.

*To all whom it may concern:*

Be it known that I, SAMUEL S. COLT, a citizen of the United States, residing at Orange, in the county of Essex and State of New Jersey, have invented certain new and useful Improvements in Molding Apparatus and Clamping Means Therefor; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in concrete construction; and, the present invention has reference, more particularly, in the production of a novel clamping or retaining means which is especially adapted for use with the spanning members, or similar holding elements employed in connection with a cribbing, or the like, such as is used to provide various forms for producing concrete structures, such as walls, blocks, columns, and the like.

The present invention, therefore, has for its principal object to provide in connection with the spanning members, or other retaining elements of a cribbing or form of molding concrete structures, a simply constructed and efficiently operating clamping or retaining means which adapts itself automatically to any desired angle, and, furthermore, provides a means of holding or retaining the various elements of the cribbing or mold in desired angular relations.

The invention has for its further object to provide a novel and simply constructed clamping element of the general character hereinafter more fully set forth; and one in which the tensile strength of the tension member is fully brought into action.

The present invention has for its further purpose to provide a clamping element in which all of the moving retaining elements thereof are held in their adjusted and fixed positions, either by friction or by the depression of one of the members of the device into the abutting member of the cribbing or other mold-structure.

Other objects of the present invention not at this time more particularly enumerated will be clearly understood from the following detailed description of the present invention.

With the various objects of the invention in view, the said invention consists, primarily, in the novel arrangement and combination with the spanning member or other retaining or holding elements of a cribbing or other suitable mold-structure, of an automatically adjustable clamping means, for holding the cribbing or mold-members in desired angular relation; and, the present invention consists, furthermore, in the novel construction of clamping or retaining elements hereinafter more fully set forth in the following specification.

The invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Figure 1 is a top or plan view of a cribbing or molding form, an the various clamping or retaining elements or means employed in connection therewith and showing one embodiment of the principles of the present invention.

Fig. 2 is a plan view of one of the clamping elements used in connection with the structure represented in said Fig. 1; and Fig. 3 is a face view of the same, said views being made on an enlarged scale.

Fig. 4 is an enlarged detail face view of the various devices and parts, looking in the direction of the arrow X in said Fig. 1; and Fig. 5 is an enlarged vertical sectional representation of the same, said section being taken on line 5—5 in said Fig. 1.

Fig. 6 is a top or plan view of a cribbing or molding form, showing connection with the various members thereof, a slightly modified arrangement of automatically adjustable clamping or retaining means.

Fig. 7 is a plan view of one of the corners of a cribbing or other molding structure, and its spanning members, said view showing in connection therewith, another slightly modified construction of self-adjustable clamping or retaining means; and Fig. 8 is an elevation of the said devices and parts, looking in the direction of the arrow Y in said Fig. 7.

Fig. 9 is a plan view showing fragmentary parts of the overlapping spanning members of a cribbing or other mold-structure, and illustrating in connection therewith still another modified construction of clamping means embodying the principles of the present invention; and Fig. 10 is an end elevation of the same, looking in the direction of the arrow Z in said Fig. 9.

Similar characters of reference are employed in all of the said above described views, to indicate corresponding parts.

Referring now to the several figures of the drawings, the reference-character 1 indicates a plurality of main retaining members, usually vertically disposed cribbing-boards or sections, and the characters 2 and 3 indicate, respectively, the usual longitudinally and transversely disposed spanning members or other retaining elements.

Referring now more particularly to Figs. 1 to 5 inclusive, it will be seen that the spanning members 2 may be provided with one or more bolt or pivot-receiving perforations 4, and that the spanning members 3 may likewise be provided with one or more bolt or pivot-receiving perforations 5. As shown in Figs. 4 and 5 of the drawings, the spanning members 2 are usually arranged in pairs, with the single spanning members 3 having their extending end-portions disposed between the said pairs of spanning members 2, thereby providing the four overlapped angles or corners 6, 6 and 7, 7, in the manner indicated more particularly in Fig. 1 of the drawings.

As will be evident from an inspection of said Fig. 1, any one of the holes or perforations 5 can be brought into alinement with any one of the holes or perforations 4, the overlapping portions at the angles or corners 6, 6, being pivotally connected by means of inserted pins or bolts 8, provided with suitable washers 9 and tightening nuts 10 for securing these parts in their angularly adjusted relations, as will be evident. At the overlapping portions of the members 2 and 3, providing the angles or corners 7, 7, are suitably disposed and automatically adjustable clamping elements or members, these members being arranged, respectively, upon the upper and lower surfaces of the respective spanning members 3, and against the vertical side-faces of the respective spanning members 2, 2, with the clamping elements or members which are located against the vertical side-faces of the spanning members 3 being disposed between the two extending end-portions of the spanning members 2, as indicated in Figs. 1, 4 and 5 of the drawings. The several clamping elements or members are all of the same general construction, and as indicated in Figs. 2 and 3 of the drawings, each clamping member consists of a back-plate 11 and a pair of angularly formed plates, as 12 and 13, which are assembled as shown in said Figs. 2 and 3, and are secured together by means of rivets 14 or other suitable fastening means, so as to provide each clamping device with a pivot or bolt-receiving space or opening, as 15. As will be understood, the several overlapping portions of the spanning members are provided with suitably disposed holes or perforations 16, as shown in Fig. 5 of the drawings, through which pivot-pins or bolts 17 are inserted, said bolts or pins 17 being also passed into and through the spaces or openings 15 of the respective clamping devices, and the various parts being secured and held in their assembled relations by the heads 18, washers 19 and 20, and tightening nuts 21, in the manner clearly indicated in the several figures of the drawings. When the several clamping devices have thus been arranged in place, suitably formed wedges 22 are driven between the base-plates 11 of the respective clamping members, and the several vertical side-faces of the respective spanning members 2 and 3, as will be clearly understood from an inspection of Figs. 1 and 4 of the drawings. As indicated in Figs. 3, 4 and 5, the various clamping elements or members may be provided with suitably disposed holes or perforations 23 for the reception of nails or pins 24 which are driven into the wedges 22, after the latter have been tightly forced home, the purpose of said nail being to retain said wedges in their securing wedged retaining positions, against accidental displacement due to shrinkage or otherwise.

From an inspection of said Fig. 1 it will clearly be seen, that no matter what the angular relation of the adjacent faces of the concrete structure desired is at the end of the wall, or of the block, column, or the like, the several clamping or retaining elements or members, as well as the spanning members will automatically adjust themselves to the desired angular relations, the full clamping strength and the tensile strength of the tension members, that is of the spanning members, is wholly brought into action, without any deteriorating effects upon the wall, or upon any of the members forming part of the cribbing or the mold-structure.

In order to dispense with the holes or perforations 5 and 4 in the respective spanning members 2 and 3, which in time may become unduly worn, or with constant use may be the cause of parts of the spanning members splitting or breaking away, the pivot-members located at the angles or corners 6, 6, in the form shown in Fig. 1 of the drawings, may be dispensed with, and clamping members of the construction shown at the angles or corners 6, 6 in Fig. 6 of the drawings may be used in lieu thereof.

The clamping devices located at the angles or corners 7, 7 are the same as those shown and described in connection with said Fig. 1, and the clamping devices located at the angles or corners 6, 6, of the form shown in said Fig. 6, are of the same construction as the heretofore described clamping devices, except that the wedges 22 in this case are dispensed with, and the back-plates 11 of the respective clamping devices in this case bearing directly against the various vertical side-faces of the respective spanning members 2 and 3.

Any further description of the same is therefore deemed unnecessary. When it is desired to use singly disposed overlapping spanning members, in the manner indicated in Figs. 7 and 8 of the drawings, that is dispensing with the arrangement of the members 2 in pairs, I may use the same general construction of clamping or holding devices as those described in connection with forms illustrated in said Figs. 1 and 6 of the drawings, except that in connection with the bolts of said devices I use suitably disposed washers 25 and 26, respectively provided with suitable extensions or fingers, as 27 and 28, which extend over and embrace the overlapping portions of the spanning members, substantially shown. The purpose of said extensions or fingers is to retain the overlapping portions of the spanning members 2 and 3 against accidental separation before the several wedges 22 are firmly driven home, as will be clearly understood from an inspection of said Figs. 7 and 8. In all other respects, the general construction and arrangement of the several clamping devices is the same as that heretofore described in connection with Figs. 1 to 6 inclusive.

In lieu of the heretofore described clamping or holding devices, clamping devices of the construction illustrated in Figs. 9 and 10 may be used in connection with the overlapping portions of the spanning members 2 and 3.

While in said Figs. 9 and 10, I have shown but one clamping device, in connection with the angle or corner, it will be fully understood, that in actual practice, each angle or corner has an arrangement of two of such clamping devices.

The clamping or retaining device illustrated in said last-mentioned figures consists, essentially, of a pair of back-plates 29, the respective end-portions of which are preferably angularly bent or curved, as at 30, and a pair of angularly formed plates as 31 and 32, said plates 31 and 32 being securely connected by means of a rivet 33, or other suitable fastening means, and each pair of back-plates 29 and the said plates 31 and 32 being separated by means of tubular spacing elements, as 34, to provide bolt-receiving spaces 35, and the various plates being connected and secured in their relative positions by means of rivets 36 which are passed through the said spacing elements 34 in the manner indicated in Fig. 9 of the drawings. Bolts 37, provided with heads 38 and washers 39 are passed into and through the space formed between the lower arrangement of said plates 29, and 31 and 32, said bolts extending in upward directions into and through the space formed between the upper arrangement of said plates 29, and 31 and 32. Upon the screw-threaded portion of each bolt 37 is a tightening nut 40 and a washer 41, each washer having an extension or finger, as 42, said fingers being provided near their free end-portions with holes for the reception of nails 43.

In practice, a clamping device is disposed upon the overlapping end-portion of each spanning member 2 and 3, in a manner that the upper and lower arrangement of the plates 29, and 31 and 32, will be located upon the upper and lower faces of the spanning members, with the bolts disposed against the vertical faces of said spanning members, substantially represented in Fig. 10 of the drawings. After the clamping devices have thus been arranged in their operative positions upon the respective spanning members, and secured in clamped relation thereto by tightening the nuts 40, the washers 41 having previously been brought into the positions shown in Fig. 9, with the nails 43 driven into the spanning members, wedges 44 are driven back of the respective plates 29 and the vertical faces of the respective spanning members, substantially in the manner and for the purposes previously described in connection with the constructions and arrangements of the devices as illustrated in Figs. 1 to 8 inclusive, and as described in the foregoing specification, in connection with said figures.

From the foregoing description of the present invention, it will be seen, that I have produced a very simple and operative construction of clamping or retaining means for cribbings or mold-forms for the forming of walls, or for producing any other desired structure of concrete or similar material, the clamping or holding means being most efficient in its operation and being self-adjustable with relation to the several members of the cribbing or mold-form, no matter what the angular relations of the cribbing or mold-members may be.

Of course, I am aware that changes may be made in the general arrangements and combinations of the various devices and parts, as well as in the details of the construction of the herein-described clamping or retaining means, without departing from the scope of the present invention as set forth in the foregoing specification, and as defined in the clauses of the claims which are appended to the said specification. Hence, I do not limit my present invention to the exact arrangements and combinations of the several devices and parts as described in the said specification, nor do I confine myself to the exact details of the construction of the said parts as illustrated in the accompanying drawings.

I claim:—

1. In combination with adjustably disposed coöperating elements, a rotatably disposed self-adjustable wedge receiving and engaging means coöperating with said elements for bringing said elements into adjusted relation.

2. In combination with adjustably disposed coöperating elements, a self-adjustable wedge-engaging means coöperating with said elements for bringing said elements into adjusted relation, comprising a plurality of connected plates, and a wedge adapted to be brought into coöperative engagement with one of said plates.

3. A knock-down form or cribbing for use in the erection of concrete and similar structures, comprising main retaining members, spanning members, and a rotatably disposed and self-adjusting wedge engaging clamping or holding means coöperating with said spanning members to maintain various angular relations between the several members of the form or cribbing.

4. A knock-down form or cribbing for use in the erection of concrete and similar structures, comprising main retaining members, spanning members, a rotatably disposed and self-adjusting wedge engaging clamping or holding means coöperating with said spanning members to maintain various angular relations between the several members of the form or cribbing and wedges disposed between said clamping or holding means and the said spanning members.

5. A knock-down form or cribbing for use in the erection of concrete and similar structures, comprising main retaining members, spanning members, and self-adjusting clamping or holding means coöperating with said spanning members to maintain various angular relations between the several members of the form or cribbing said clamping or holding means comprising a plurality of plates connected so as to provide a bolt-receiving space between them, said spanning members being provided with perforations in registration with the said bolt-receiving spaces, pivot-bolts in the registering perforations and bolt-receiving spaces, and means coöperating with said bolts for bringing the said clamping means in retaining relation with the spanning members.

6. A knock-down form of cribbing for use in the erection of concrete and similar structures, comprising main retaining members, spanning members, and self-adjusting clamping or holding means coöperating with said spanning members to maintain various angular relations between the several members of the form or cribbing said clamping or holding means comprising a plurality of plates connected so as to provide a bolt-receiving space between them, said spanning members being provided with perforations in registration with the said bolt-receiving spaces, pivot-bolts in the registering perforations and bolt-receiving spaces, and wedges disposed between said clamping or holding means and the spanning members.

7. A knock-down form or cribbing for use in the erection of concrete and similar structures, comprising main retaining members, spanning members, and self-adjusting clamping or holding means coöperating with said spanning members to maintain various angular relations between the several members of the form or cribbing, said clamping or holding means comprising a plurality of plates connected so as to provide a bolt-receiving space between them, said spanning members being provided with perforations in registration with the said bolt-receiving spaces, pivot-bolts in the registering perforations and bolt-receiving spaces, one of said plates being provided with a nail-receiving perforation, wedges disposed between said clamping or holding means, and nails in the said nail-receiving perforations adapted to be driven into said wedges.

8. A knock-down form or cribbing for use in the erection of concrete and similar structures, comprising angularly disposed main retaining members and spanning members having overlapped end-portions provided with bolt-receiving perforations, pivot-bolts in the registering perforations of one of said overlapping end-portions of the spanning members, and a self-adjusting clamping or holding means connected with another of said overlapping end-portions of the spanning members, said clamping or holding means comprising a plurality of plates connected so as to provide a bolt-receiving space between them, pivot-bolts in the registering perforations of said last-mentioned overlapping end-portions of the spanning members and the said bolt-receiving space, and means coöperating with said bolts for bringing the said clamping means in retaining relation with the spanning members.

9. A knock-down form or cribbing for use in the erection of concrete and similar structures, comprising angularly disposed main retaining members and spanning members having overlapped end-portions provided with bolt-receiving perforations, pivot-bolts in the registering perforations of one of said overlapping end-portions of the spanning members, and a self-adjusting clamping or holding means connected with another of said overlapping end-portions of the spanning members, said clamping or holding means comprising a plurality of plates connected so as to provide a bolt-receiving space between them, pivot-bolts in the registering perforations of said last-mentioned overlapping end-portions of the spanning members and the said bolt-receiving space, and wedges disposed between said clamping or holding means and the spanning members.

10. A knock-down form or cribbing for use in the erection of concrete and similar structures, comprising angularly disposed main retaining members and spanning members having overlapped end-portions provided with bolt-receiving perforations, pivot-bolts in the registering perforations of one of said overlapping end-portions of the spanning members, and a self-adjusting clamping or holding means connected with another of said overlapping end-portions of the spanning members, said clamping or holding means comprising a plurality of plates connected so as to provide a bolt-receiving space between them, pivot-bolts in the registering perforations of said last-mentioned overlapping end-portions of the spanning members and the said bolt-receiving space, one of said plates being provided with a nail-receiving perforation, wedges disposed between said clamping or holding means, and nails in the said nail-receiving perforations adapted to be driven into said wedges.

11. The herein described clamping or holding device comprising a plurality of plates, and means for securing said plates together to provide a pivot-bolt receiving space between said plates.

12. The herein described clamping or holding device comprising a back-plate, a pair of angularly formed plates, and means for securing said angularly formed plates to said back-plate to provide a pivot-bolt receiving space between said plates.

13. The herein described clamping or holding device comprising a back-plate, a pair of angularly formed plates, and means for securing said angularly formed plates to said back-plate to provide a pivot-bolt receiving space between said plates, combined with a pivot-bolt provided at one end with a head, and a binding nut mounted upon said bolt, and a pair of washers also mounted upon said bolt, one of said washers being provided with a laterally projecting extension or finger.

14. A wedge-retaining element, combined with an oppositely placed and angularly adjustable wedge-receiving element, a wedge movably disposed between said elements, and means for securing said wedge-receiving element in a fixed position.

In testimony, that I claim the invention set forth above I have hereunto set my hand this 26th day of December, 1919.

SAMUEL S. COLT.

Witnesses:
FRED D. FRAENTZEL,
BARBARA W. SUTTERLIN.